United States Patent
Yoshikawa et al.

(10) Patent No.: US 9,778,686 B2
(45) Date of Patent: Oct. 3, 2017

(54) ELECTRONIC APPARATUS, ITS CONTROL METHOD AND PROGRAM, AND STORAGE MEDIUM

(71) Applicant: CANON KABUSHIKI KAISHA, Tokyo (JP)

(72) Inventors: Akio Yoshikawa, Tokyo (JP); Kurumi Mori, Kawasaki (JP); Tomohiro Ota, Kawasaki (JP); Toshimichi Ise, Yokohama (JP); Kyota Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 666 days.

(21) Appl. No.: 14/302,630

(22) Filed: Jun. 12, 2014

(65) Prior Publication Data

US 2015/0007072 A1    Jan. 1, 2015

(30) Foreign Application Priority Data

Jun. 28, 2013 (JP) ................................ 2013-135816

(51) Int. Cl.
*G06F 1/16* (2006.01)

(52) U.S. Cl.
CPC .......... *G06F 1/1626* (2013.01); *G06F 1/1686* (2013.01); *G06F 1/1694* (2013.01)

(58) Field of Classification Search
CPC .... G06F 1/1626; G06F 1/1686; G06F 1/1694; G06F 3/0412; G06F 3/0416; G06F 3/04842

See application file for complete search history.

(56) References Cited

U.S. PATENT DOCUMENTS

| | | | |
|---|---|---|---|
| 2002/0136557 A1* | 9/2002 | Shimamura | G03B 17/08 396/535 |
| 2002/0195910 A1* | 12/2002 | Hus | G06F 1/1626 312/223.2 |
| 2005/0143124 A1* | 6/2005 | Kennedy | G06F 1/1626 455/556.1 |
| 2010/0053854 A1* | 3/2010 | Nishikawa | G06F 1/1626 361/679.01 |

(Continued)

FOREIGN PATENT DOCUMENTS

| | | |
|---|---|---|
| JP | 2007-300353 A | 11/2007 |
| JP | 2010-282143 A | 12/2010 |

*Primary Examiner* — Tom Sheng
(74) *Attorney, Agent, or Firm* — Fitzpatrick, Cella, Harper & Scinto

(57) ABSTRACT

An electronic apparatus includes a touch detection unit that detects a touch operation to a display unit. A display control unit controls operation so as to display a touch icon to the display unit. An attitude detection unit detects an attitude of the electronic apparatus. A setting unit sets a case mode to be used when the electronic apparatus is put in a case. A control unit controls, in a case when the case mode is not set by the setting unit, to change a position of a touch-responsive area adapted to receive a touch operation to the touch icon in accordance with the attitude of the electronic apparatus detected by the attitude detection unit, and, in a case when the case mode is set by the setting unit, not to change the position of the touch-responsive area irrespective of the attitude of the electronic apparatus.

25 Claims, 7 Drawing Sheets

(56) References Cited

U.S. PATENT DOCUMENTS

| | | | | |
|---|---|---|---|---|
| 2010/0200456 A1* | 8/2010 | Parkinson | ............ | B29C 33/485 |
| | | | | 206/701 |
| 2012/0052929 A1* | 3/2012 | Thammasouk | ....... | G06F 1/1626 |
| | | | | 455/575.1 |
| 2012/0188004 A1* | 7/2012 | Slotznick | ............. | H03K 17/965 |
| | | | | 327/517 |
| 2013/0278552 A1* | 10/2013 | Kamin-Lyndgaard | . | G09G 5/006 |
| | | | | 345/174 |
| 2013/0322013 A1* | 12/2013 | Steele | .................... | A45C 11/00 |
| | | | | 361/679.55 |
| 2014/0224685 A1* | 8/2014 | Carnevali | ............. | G06F 1/1626 |
| | | | | 206/320 |
| 2015/0141093 A1* | 5/2015 | Sela | ..................... | H04B 1/3888 |
| | | | | 455/575.8 |

* cited by examiner

ELECTRONIC APPARATUS, ITS CONTROL METHOD AND PROGRAM, AND STORAGE MEDIUM

CLAIM OF PRIORITY

This application claims the benefit of Japanese Patent Application No. 2013-135816, filed on Jun. 28, 2013, which is hereby incorporated by reference herein in its entirety.

BACKGROUND OF THE INVENTION

Field of the Invention

The present invention relates to an electronic apparatus, its control method and program, and a storage medium, and, more particularly, to rotation control of an image to be displayed onto a touch panel in a case when the attitude state is detected in an electronic apparatus.

Description of the Related Art

In recent years, an electronic apparatus that rotates an image displayed to a display unit in accordance with attitude information of a main body and displays the rotated image is proposed. Japanese Patent Application Laid-Open No. 2007-300353 discloses such a technique that, in a digital camera having a touch panel, a display position and a display orientation of an operation key that is displayed on the touch panel are changed in accordance with an attitude of the digital camera.

There is also a case when an electronic apparatus is put in a case for the purpose of waterproof, dustproof, drip-proof, or protection from shock, or the like. Since the touch panel cannot be directly touched when the electronic apparatus having the touch panel is put in the case, the touch operation will be interfered. On the other hand, Japanese Patent Application Laid-Open No. 2010-282143 proposes a waterproof housing that encloses an imaging apparatus, that is, a waterproof housing having an operation member for mechanically propagating an operation from outside of the housing to a touch panel equipped for the imaging apparatus.

According to the waterproof housing disclosed in Japanese Patent Application Laid-Open No. 2010-282143, the touch operation can be performed only to a specific position of the touch panel in the housing from outside of the housing. If such a waterproof housing is applied to the electronic apparatus in which the display position of the touch icon changes in accordance with the attitude of the electronic apparatus, as disclosed in Japanese Patent Application Laid-Open No. 2007-300353, there is a possibility that the touch icon is moved to a position due to the attitude of the electronic apparatus, where the touch icon cannot be operated.

It is, therefore, an aspect of the invention to provide an electronic apparatus that is arranged such that even if an attitude of the electronic apparatus changes in a case when the electronic apparatus having a touch panel is put in a case, an operation to the touch panel can be executed from outside of the case, and to provide a control method and a program for such an electronic apparatus, as well as a storage medium.

SUMMARY OF THE INVENTION

According to an aspect of the invention, an electronic apparatus comprises a touch detection unit configured to detect a touch operation to a display unit, a display control unit configured to control operation so as to display a touch icon to the display unit, an attitude detection unit configured to detect an attitude of the electronic apparatus, a setting unit configured to set a case mode to be used when the electronic apparatus is put in a case, and a control unit configured to control operation, in a case when the case mode is not set by the setting unit, to change a position of a touch-responsive area adapted to receive a touch operation to the touch icon in accordance with the attitude of the electronic apparatus detected by the attitude detection unit, and, in a case when the case mode is set by the setting unit, not to change the position of the touch-responsive area irrespective of the attitude of the electronic apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

First Embodiment

Figure 1:
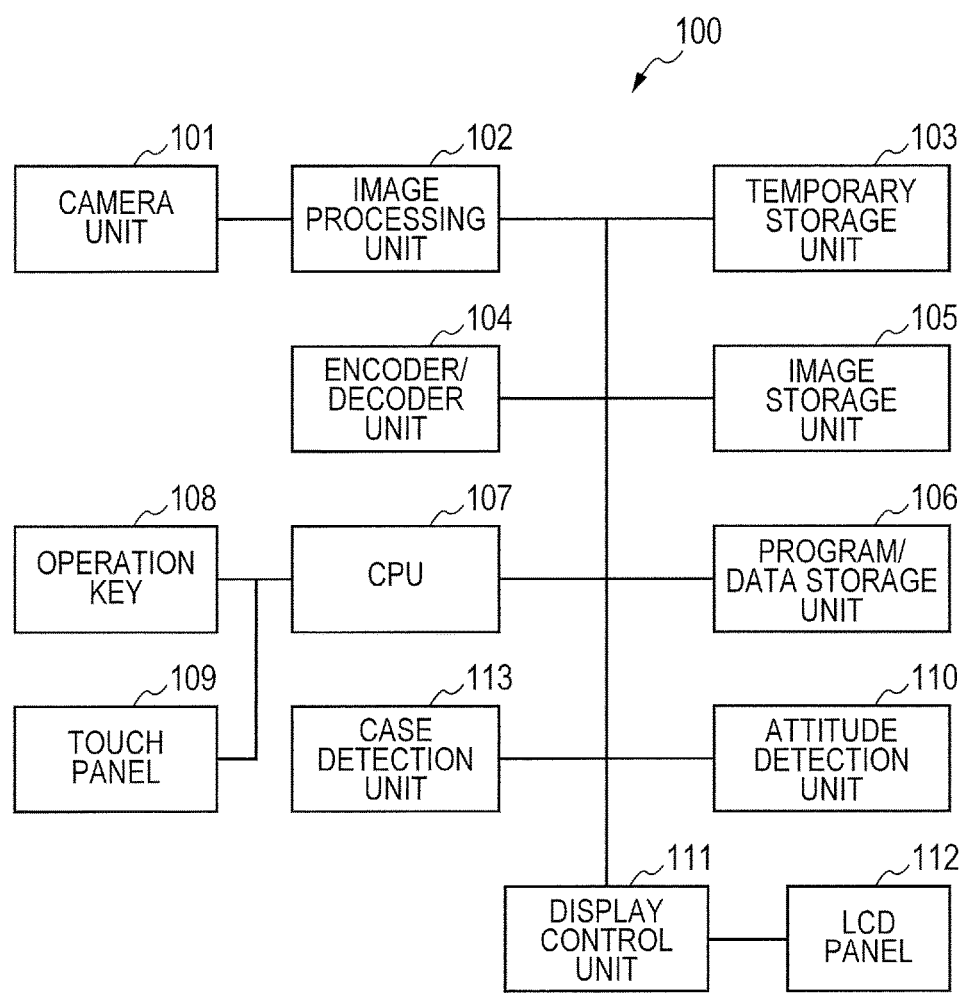
FIG. 1 is a schematic constructional block diagram of an embodiment of the invention.

FIG. 1 illustrates a schematic constructional block diagram of a digital camera 100 as an embodiment of an electronic apparatus according to the invention.

In the digital camera 100, a CPU 107 reads out a control program from a program/data storage unit 106 and controls the operation of the whole camera 100. The CPU 107 can execute, in a parallel manner, a plurality of tasks of the control program read out of the program/data storage unit 106. Specifically speaking, a mode control task, a camera control task, a recorder control task, and a display control task operate on the CPU 107 in a parallel manner. The CPU 107, which executes the display control task, plays a function as a display control unit.

A temporary storage unit 103 functions as a work area of the CPU 107 and is a RAM that also functions as a frame buffer for a moving image and a frame buffer for an OSD (On Screen Display). Display items that have previously been stored in the program/data storage unit 106 are called "OSD data" below, so as to be distinguished from a photographed image picked up by a camera unit 101. Various kinds of information for menu, icons, touch icons, and the like, are included in the OSD data.

The camera unit 101 is a unit for inputting an analog image signal into the digital camera 100. Specifically speaking, the camera unit 101 includes a photographing lens for focusing light from an object, an imaging element that photoelectrically converts an object image focused by the photographing lens, a circuit for driving the imaging element, and the like. An image processing unit 102 converts the analog image signal that is input from the camera unit 101 into moving image data and makes a correction based on a predetermined image processing such as noise removal, or the like. The camera control task, which is executed by the CPU 107, controls the operations of the camera unit 101 and the image processing unit 102.

An encoder/decoder unit 104 includes an encoder for encoding the moving image data from the image processing unit 102 and a decoder for decoding the encoded moving image data. The moving image data encoded by the encoder/decoder unit 104 is temporarily stored in the temporary storage unit 103 and, thereafter, is stored into an image storage unit 105 together with associated management data. The image storage unit 105 is constructed by a detachable memory card, a hard disk, or a flash memory serving as an internal recording medium, or the like. Upon reproduction of a moving image, on the contrary, the encoded moving image data that is read out of the image storage unit 105 is supplied to the encoder/decoder unit 104 through the temporary storage unit 103 and is decoded. The encoder/decoder unit 104 develops the reproduction image data obtained by the decoding into a frame buffer for a moving image in the temporary storage unit 103. The recorder control task, which is executed by the CPU 107, controls the operations of the encoder/decoder unit 104 and the image storage unit 105.

Management data, which is read out of the image storage unit 105, is used to generate OSD data, that is, data for character display or GUI (Graphical User Interface), which is superimposed to a photographed image or a reproduction image. The CPU 107 draws the generated OSD data into a frame buffer for OSD in the temporary storage unit 103. The contents of the frame buffer for the moving image and the frame buffer for the OSD are superimposed by a display control unit 111, and displayed on an LCD panel 112.

On the basis of the control of the CPU 107, the display control unit 111 executes various kinds of image processings to the OSD data, or the like, which is read out from the program/data storage unit 106. An enlargement/reduction processing (resize), a noise reduction processing, a color conversion processing, a rotation processing, and the like, are included in the image processings that are executed by the display control unit 111. The display control unit 111 may be constructed by a dedicated circuit element for executing a specific image processing. Depending on a type of the image processing, the function of the display control unit 111 may be substituted by a program that operates on the CPU 107.

Both of an operation key 108 and a touch panel 109 are operation units for receiving an operation instruction that is made by the user. The touch panel 109 is arranged so as to be overlaid onto a screen of the LCD panel 112. For example, the touch panel 109 is constructed so that a light transmissivity thereof does not obstruct the display of the LCD panel 112, and the touch panel 109 is attached to an upper layer of the display screen of the LCD panel 112. By making input coordinates on the touch panel 109 correspond to display coordinates on the LCD panel 112, such a GUI that the user directly operates the screen displayed on the LCD panel 112 can be constructed. As a touch panel 109, there are a variety of types such as resistance film type, an electric capacity type, a surface acoustic wave type, an infrared-ray type, an electromagnetic induction type, an image recognition type, a photosensor type, and the like. In the present embodiment, any one of those types may be used.

The CPU 107 can detect the following operations provided to the touch panel 109. Such an operation that the touch panel 109 is touched by a finger or pen is called (Touch-Down) below. A state in which a finger or pen is in touch with the touch panel 109 is called (Touch-On) below. Such an operation that a finger or pen is moved while keeping in touch with the touch panel 109 is called (Touch-Move) below. Such an operation that a finger or pen, which is in touch with the touch panel 109, is removed is called (Touch-Up) below. A state in which nothing is in touch with the touch panel 109 is called (Touch-Off) below.

Those operations to the touch panel 109 and coordinates of the position where the finger or pen is in touch with the touch panel 109 are notified to the CPU 107 through an internal bus. The CPU 107 discriminates the operation to the touch panel 109 on the basis of the information that is notified from the touch panel 109. That is, the CPU 107 functions as a touch detection unit for detecting the touch operation provided to the touch panel 109.

As for Touch-Move, also with respect to the moving direction of the finger or pen that is moved on the touch panel 109, the CPU 107 can discriminate a vertical component and a horizontal component of the movement on the touch panel 109 on the basis of a change in position coordinates. When Touch-Up is performed on the touch panel 109 from Touch-Down through predetermined Touch-Move, the CPU 107 determines that the finger or pen is considered to have drawn a stroke. The operation to quickly draw a stroke is called a "flick". A "flick" is such an operation that the finger or pen is quickly moved by a distance of a certain extent while keeping in touch with the touch panel 109 and is removed as it is. In other words, it is also such an operation that a finger quickly rubs the touch panel 109 as if it is flipped by the finger. When it is detected that Touch-Move is performed by a predetermined distance or longer at a predetermined speed or higher, and Touch-Up is detected as it is, the CPU 107 determines that a "flick" is performed. When it is detected that a Touch-Move is performed by the predetermined distance or longer and at a speed lower than the predetermined speed, the CPU 107 determines that "drag" is performed.

Figure 2A:
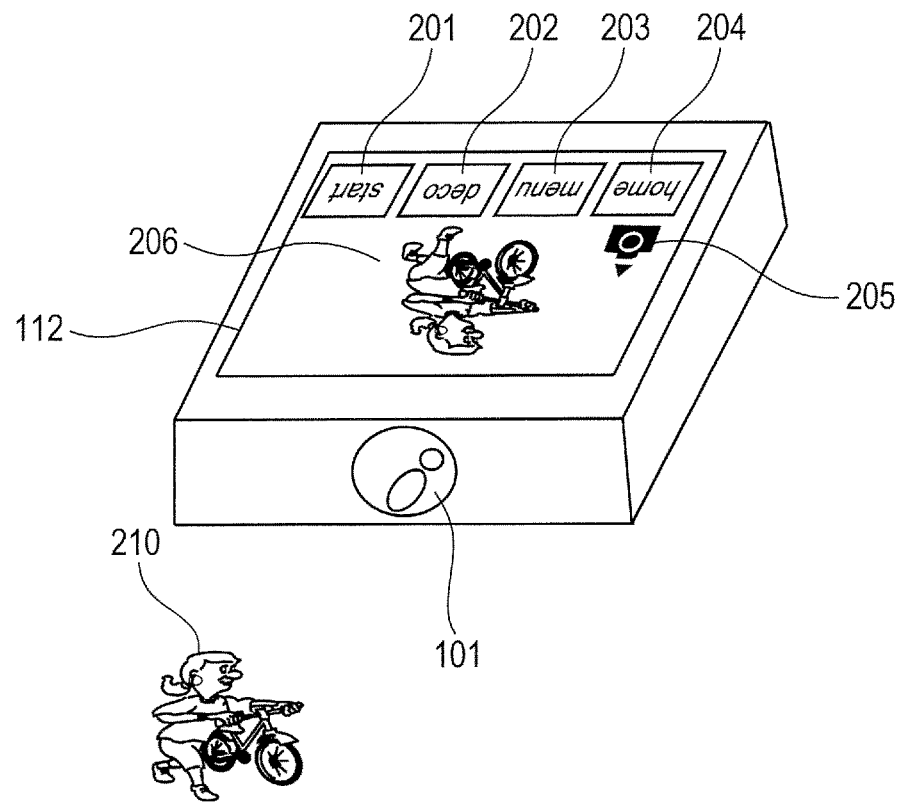
FIGS. 2A and 2B are examples of a display screen upon photographing in a normal attitude and an inverse attitude.
Figure 2B:
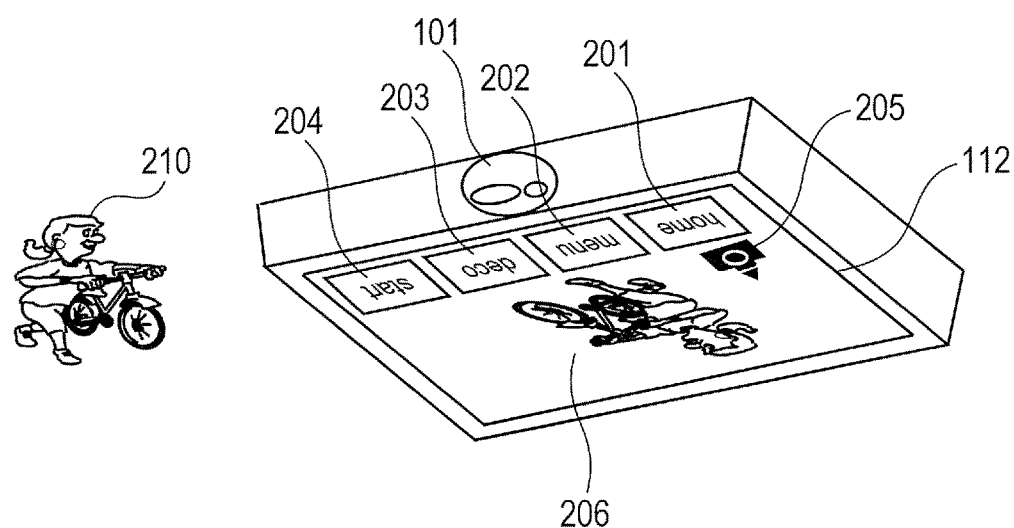

An attitude detection unit 110 is constructed by an acceleration sensor or a gyro sensor and detects a change in orientation of the main body of the camera 100. FIG. 2A illustrates a state in which the camera 100 is used in a normal attitude or a normal position. FIG. 2B illustrates a state in which the camera 100 is used in an inverse attitude or a non-normal position. The digital camera 100 is constructed in such a manner that, as illustrated in FIG. 2A, the camera unit 101 and the LCD panel 112 have such a positional relation when the camera unit 101 is oriented forwardly, the LCD panel 112 is oriented upwardly, in a horizontal state. In the present embodiment, such a position illustrated in FIG. 2A is assumed to be the normal attitude or normal position. A position to which the camera 100 is rotated so that the LCD panel 112 is oriented almost downwardly while keeping the camera unit 101 so as to face forward becomes an inverse attitude or inverse position illustrated in FIG. 2B. The attitude detection unit 110 can detect such an attitude change of the camera 100.

A case detection unit 113 is an enclosure detection unit for detecting that the digital camera 100 is put (enclosed) into a drip-proof case. For example, the case detection unit 113 is constructed by a detection switch that is depressed by a projection of the drip-proof case in the case the camera 100 is put in the drip-proof case. If the detection switch is in a depression state, the CPU 107 determines that the camera 100 is put in the drip-proof case. If the detection switch is not in the depression state, the CPU 107 determines that the camera 100 is not put in the drip-proof case. The case detection unit 113 may be constructed by a device other than such a detection switch. For example, an illuminance sensor is arranged in a portion that is light-shielded in a case when the camera 100 is put in the drip-proof case, and in a case when a predetermined darkness more than a predetermined darkness is detected by the illuminance sensor, it is determined that the camera 100 is put in the drip-proof case.

In FIG. 2A, the camera unit 101 picks up an image of an object 210. The display control unit 111 composes a photographed image (live-view image visible as moving-image data) from the camera unit 101 and the OSD data from the program/data storage unit 106 and displays a composition result onto the LCD panel 112. Touch icons 201 to 204 and an attitude icon 205 are superimposed to a photographed image 206 and are displayed onto the LCD panel 112. Different functions are allocated to the touch icons 201 to 204. When there is a tap to each touch-responsive area, the CPU 107 executes the function allocated to each touch icon.

The attitude icon 205 is an icon showing the current attitude of the digital camera 100 detected by the attitude detection unit 110. In a case when the digital camera 100 is in the normal attitude, an arrow of the attitude icon 205 indicates an upward direction of the camera (the direction in which the lenses of the camera unit exist). In a case when the digital camera 100 is in an upside-down (inverse) position (inverse attitude), the arrow of the attitude icon 205 indicates a downward direction of the camera (direction opposite to the direction in which the lenses of the camera unit exist).

In a case when the digital camera 100 is in the normal attitude, the CPU 107 stores a moving image or a still image of the photographed image as an image file into the image storage unit 105 while keeping its orientation as it is. On the other hand, in a case when the digital camera 100 is in the inverse attitude, the CPU 107 rotates the photographed image by one hundred eighty degrees or performs a vertical and horizontal inverse processing to the photographed image, and records a resultant image into the image storage unit 105. The rotation processing of one hundred eighty degrees and the vertical and horizontal inverse processing are substantially synonymous, so that the images of the same orientation are obtained. By executing such a processing, even in the case of the image photographed in the inverse attitude, the image can be displayed in the correct direction upon reproduction.

If an image to be displayed as a live-view is rotated by one hundred eighty degrees and displayed upon photographing, the orientation of the image differs from that of the object 210, so that a resultant image becomes unnatural. Therefore, even if the image is in the inverse attitude, the CPU 107 displays the live-view image for displaying a photographing image onto the LCD panel 112 while keeping its orientation as it is.

In the case of FIG. 2B, in which the object 210 is photographed in the inverse attitude, the display control unit 111 composes the photographed image from the camera unit 101 and the OSD data from the program/data storage unit 106, and displays a composition result onto the LCD panel 112. Since the camera 100 is in the inverse attitude, the vertical and horizontal directions of the object 210 on the LCD panel 112 are inverted from those in FIG. 2A. In the inverse attitude, the CPU 107 arranges the touch icons 201 to 204 and the attitude icon 205 to the vertical positions opposite to those in the case of FIG. 2A. That is, the touch icons 201 to 204 and the attitude icon 205 arranged in the downward position of the digital camera 100 in the normal attitude illustrated in FIG. 2A are arranged in the upward position of the digital camera 100 in the inverse attitude illustrated in FIG. 2B. The arrow of the attitude icon 205 indicates the downward direction of the camera opposite to that in FIG. 2A. As mentioned above, in the inverse attitude, the OSD is displayed in the position and orientation in which it is rotated by one hundred eighty degrees as compared with those in the case of the normal attitude. Thus, even if the digital camera 100 is held upside-down, the position of the OSD, when seen from the user, is equal to that in the case of the normal attitude and use efficiency is improved.

Figure 3A:
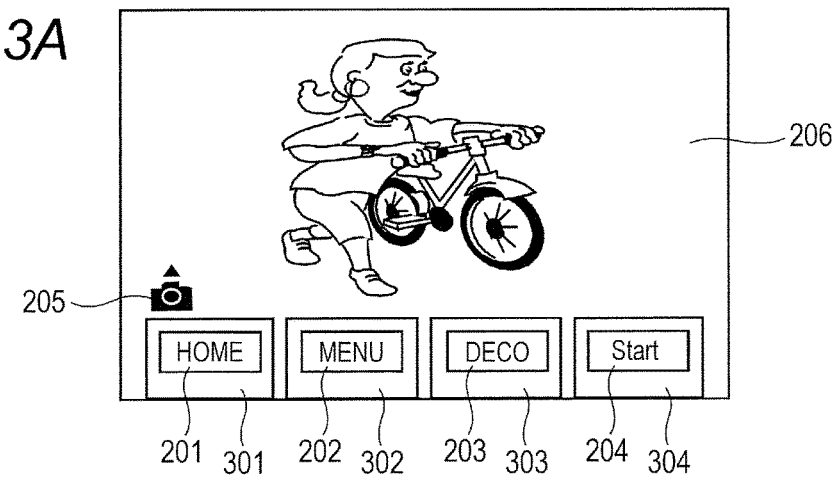
FIGS. 3A, 3B, and 3C are examples of a display screen upon photographing in the normal attitude, the inverse attitude, and an inverse attitude, in a case mode.
Figure 3B:
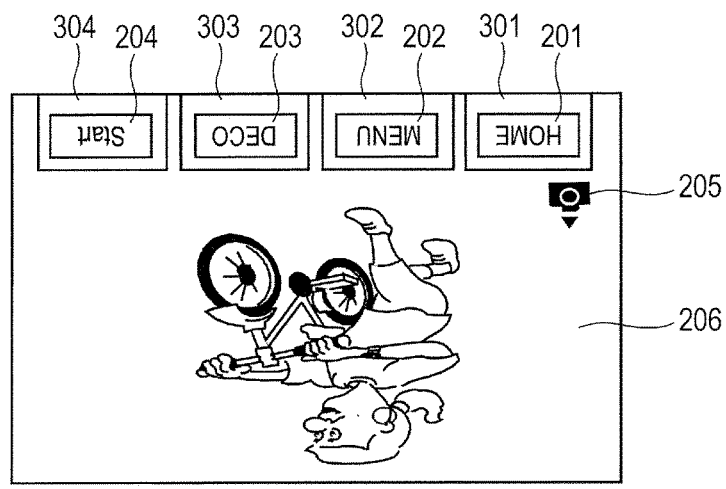
Figure 3C:
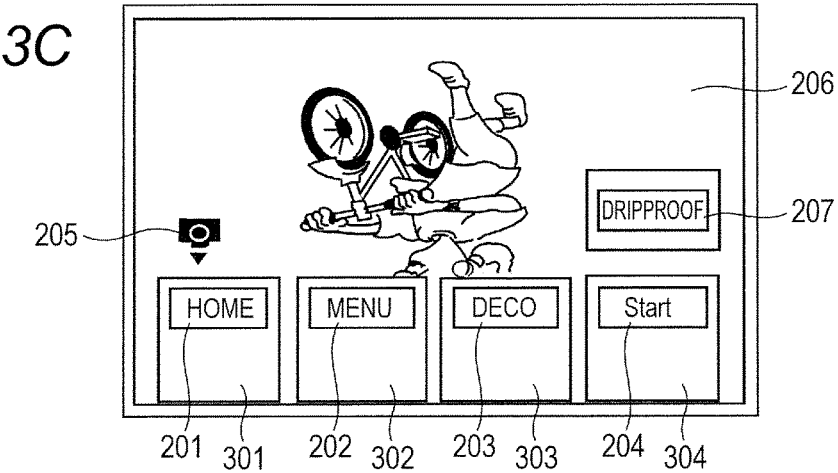

FIGS. 3A to 3C illustrate display examples of the photographed image 206 and various kinds of OSD elements, such as touch icons, and the like, on the LCD panel 112 in respective attitudes. FIG. 3A illustrates the display example of the photographed image 206 and the OSD element in the case of the normal attitude. Touch-responsive areas 301 to 304 correspond to the touch icons 201 to 204, respectively. Since the touch-responsive areas 301 to 304 are set to be wider than the display areas of the touch icons 201 to 204, even if the user tapped a position that is slightly deviated from the position of any one of the touch icons 201 to 204, the tap operation can be certainly input. When there is a tap to any one of the touch areas 301 to 304, the CPU 107 executes the function allocated to one of the touch icons 201 to 204 corresponding to the tapped one of the touch-responsive areas 301 to 304.

FIG. 3B illustrates the display example of the LCD panel 112 in the case when the attitude detection unit 110 detects the inverse attitude and a drip-proof case mode is OFF. An upward direction of the digital camera 100 (the direction in which the camera unit 101 faces) is assumed to be an upward direction in the diagram. Since the camera is in the inverse attitude, if the object image is displayed while keeping its orientation as it is, without executing the rotation and inverse processing to the photographed image 206 (live-view image), the orientation of the object is opposite to the inherent vertical direction of the LCD panel 112. Such an object image, however, is not contradictory to the object 210 in the real world. A possibility that the user who holds the digital camera 100 in the inverse attitude views the LCD panel 112, which is inversed, is high. In such a case, the object in the photographed image 206 is also seen in the normal orientation.

The touch icons 201 to 204 and the attitude icon 205 serving as OSD elements are point-symmetrically rotated by one hundred eighty degrees and displayed as compared with those in the normal attitude so that the user who holds the digital camera 100 in the inverse attitude and views the LCD panel 112, which is inversed, can easily view them. Naturally, the positions of the touch-responsive areas corresponding to the touch icons 201 to 204 are also moved in accordance with the touch icons 201 to 204. The attitude icon 205 is an arrow showing the downward direction of the digital camera 100 so as to indicate the inverse attitude.

FIG. 3C illustrates the display example of the LCD panel 112 in the case when the attitude detection unit 110 detects the inverse attitude and the drip-proof case mode is ON. In this case, in spite of a fact that the digital camera 100 is in the inverse attitude, the display positions of the OSD elements and the positions of the touch-responsive areas are substantially the same as those in the case of the normal attitude. The reason why such a construction is used will be described hereafter with reference to FIG. 5C. A touch icon 207 is a touch icon for showing that the drip-proof case mode is ON and for displaying a screen adapted to switch the setting (ON/OFF) of the drip-proof case mode.

Figure 4:
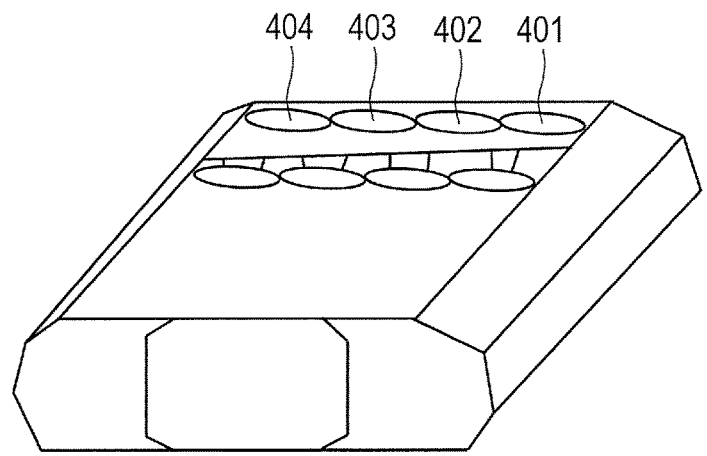
FIG. 4 is an external perspective view of a drip-proof case.

FIG. 4 illustrates an external perspective view of the drip-proof case for enclosing (putting in) the digital camera 100. The drip-proof case is made of a material such as transparent polycarbonate (PC), or the like, and protects the digital camera 100 from waterdrops. Operation members 401 to 404, which can be depressed from the outside, and whose front edge portions face specific positions (touch-responsive areas 301 to 304 in FIG. 3C) of the touch panel 109 of the digital camera 100, are provided for the drip-proof case, respectively. That is, when the operation members 401 to 404 are depressed from outside of the drip-proof case, the front edges of the operation members 401 to 404 touch the specific positions (touch-responsive areas 301 to 304 in FIG. 3C) of the touch panel 109 of the digital camera 100. If the touch panel 109 is of a type that detects a contact pressure in a resistance film method, or the like, a mechanical contact may be used.

If the touch panel 109 is of the electric capacity type, the operation members 401 to 404 may be electroconductive members. In this case, if the front edges of the operation members 401 to 404 are always in contact with the touch panel 109, or are close to the touch panel 109 so that a touch to the touch panel may be detected in the drip-proof case, it is not always necessary that the operation members 401 to 404 are movable.

Such a construction that the operation members 401 to 404 can be operated to the touch panel 109 in the drip-proof case from outside of the drip-proof case is not limited to the foregoing construction, but another construction according to the type of the touch panel can be used.

Figure 5A:
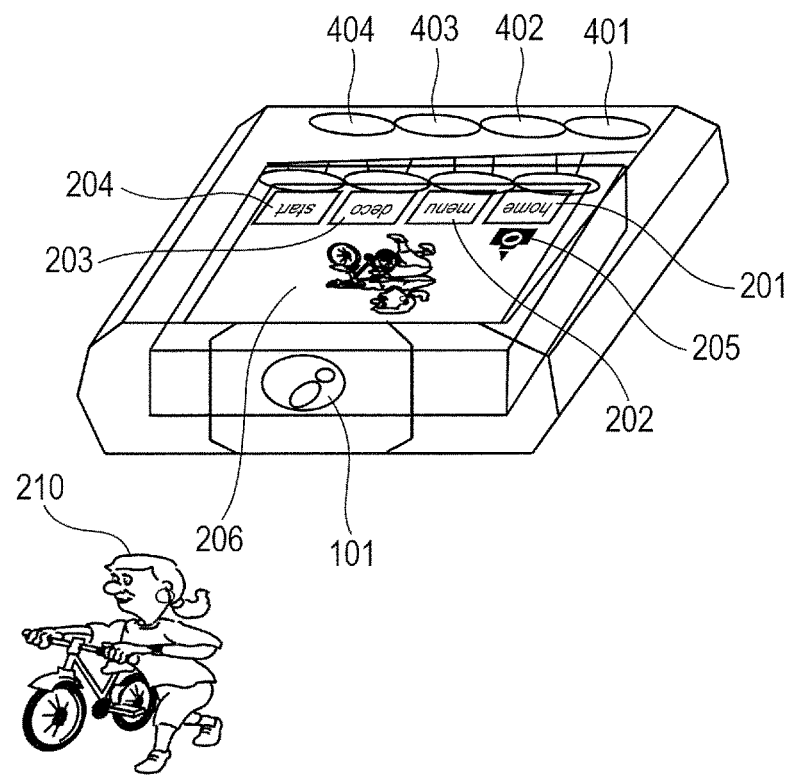
FIGS. 5A, 5B, and 5C are examples of a display upon photographing in the normal attitude or the inverse attitude when an electronic apparatus is put in the drip-proof case.

FIG. 5A illustrates a perspective view of a state in which the digital camera 100 is enclosed in the drip-proof case and performs the photographing in the normal attitude. Since the camera is in the normal attitude, the LCD panel 112 displays the object and the OSD elements in the orientation similar to that in FIG. 3A. In this case, the touch operation can be performed to the touch icons 201 to 204 on the LCD panel 112 (touch panel 109) through the operation members 401 to 404 exposed to the outside of the drip-proof case, respectively.

Figure 5B:
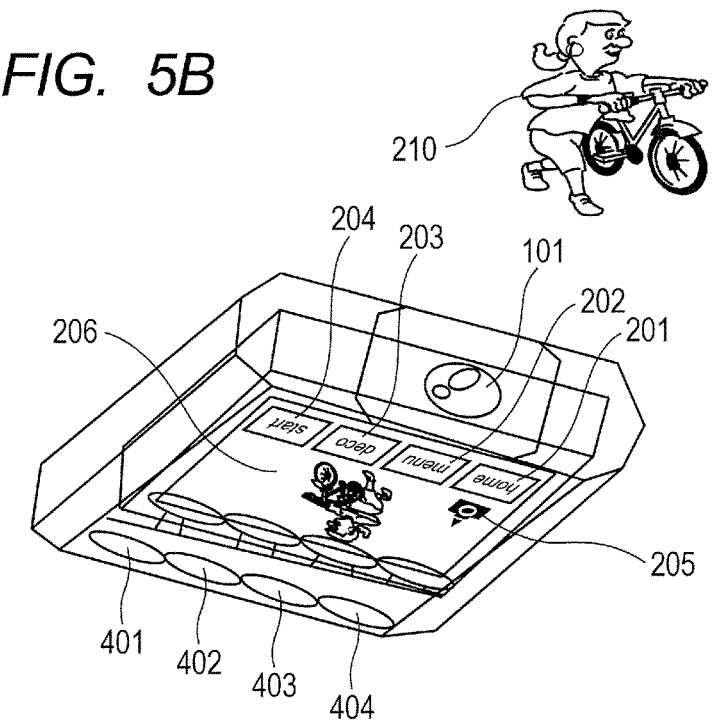

FIG. 5B illustrates a perspective view of a state in which the digital camera 100 is enclosed in the drip-proof case, the drip-proof case mode is set to OFF, and the camera performs the photographing in the inverse attitude. In this case, the LCD panel 112 displays the object and the OSD elements in the orientation and positions similar to those described in FIG. 3B. The drip-proof case mode is an operation mode to be used in a case when the digital camera 100 is enclosed in the drip-proof case and used. The user can manually set this drip-proof case mode before the camera 100 is put in the drip-proof case. Since the display positions of the touch icons 201 to 204 differ from those in the case of the normal attitude, the touch panel cannot be operated by the operation members 401 to 404 arranged in the drip-proof case. Therefore, in the state in which the digital camera 100 is put in the drip-proof case, the operation to the touch panel cannot be performed.

Figure 5C:
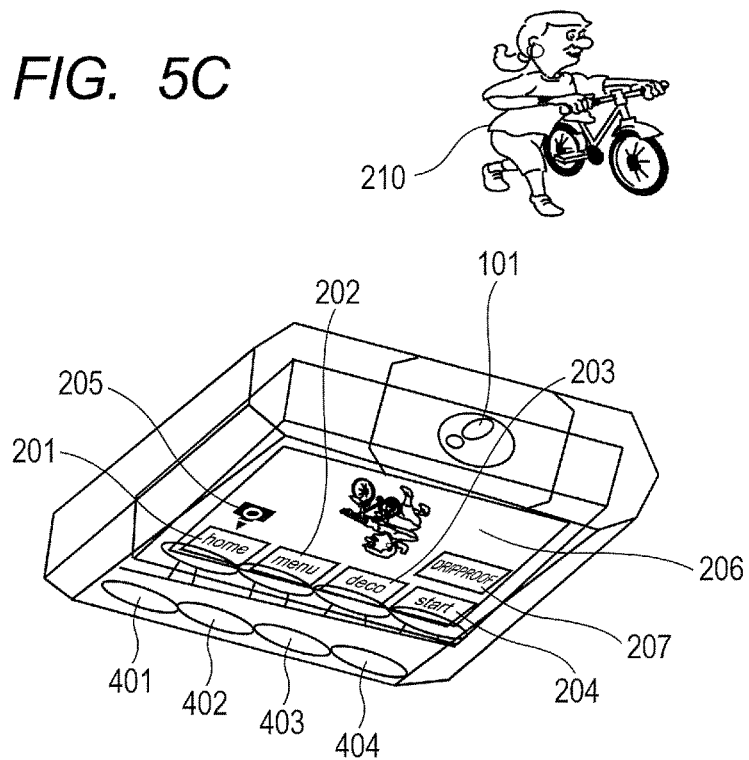

FIG. 5C illustrates a perspective view of a state in which the digital camera 100 is enclosed in the drip-proof case, the drip-proof case mode is set to ON, and the camera performs the photographing in the inverse attitude. In this case, the LCD panel 112 displays the object and the OSD elements in the orientation and positions as described in FIG. 3C. When the case detection unit 113 detects that the digital camera 100 is put in the drip-proof case, the CPU 107 automatically sets the drip-proof case mode to ON. In the drip-proof case mode, the CPU 107 displays the OSD elements that should be displayed to the LCD panel 112 to the same positions as those in the normal attitude. Particularly, the positions of the touch icons and the positions of the touch-responsive areas corresponding thereto are fixed, irrespective of the attitude. Thus, even in the inverse attitude, the touch icons 201 to 204 can be operated from outside of the drip-proof case. That is, the touch icons can be operated from outside of the case, irrespective of the attitude (even in the normal attitude or the inverse attitude).

Depending on a structure and a material of the drip-proof case, when the touch icons 201 to 204 are displayed in the positions shown in FIG. 3A as they are, there is a case in which the touch icons 201 to 204 are hidden by the operation members 401 to 404, and are difficult to be seen. In such a case, as illustrated in FIG. 3C, the positions of the corresponding touch-responsive areas 301 to 304 are not changed, but only the display positions of the touch icons 201 to 204 are moved to the slightly upper positions than those in FIG. 3A. Consequently, although the touch icons 201 to 204 are partially hidden by the operation members 401 to 404, the user can visually confirm the touch icons 201 to 204 through the drip-proof case. When the drip-proof case mode is ON, the CPU 107 executes an adjustment of the display positions of the touch icons 201 to 204, irrespective of the attitude of the camera 100. In place of the method of adjusting the display positions of the touch icons 201 to 204 or in addition to such a method, display sizes of the touch icons 201 to 204 may be increased.

In the state in which the camera is put in the drip-proof case, it will be impossible to operate the touch panel 109 in a way of any type, and the operation to the touch panel 109 depends on the operation by the operation members 401 to 404. Therefore, the apparatus may be constructed in such a manner that in a case when the drip-proof case mode is ON, the CPU 107 allocates the functions of the operation members, which is not operational due to the enclosure of the camera into the drip-proof case, to any one of the touch icons 201 to 204, thereby enabling the operation members 401 to 404 to be operated. For example, if a still image photographing button is not operational, a still image photographing cannot be performed. Therefore, a function of the still image photographing button is allocated to one of the touch icons 201 to 204. For example, the function of the still image photographing button is allocated in place of a function that may be used less frequently, in the case when the camera is put in the drip-proof case among the functions allocated to the touch icons 201 to 204.

Figure 6A:
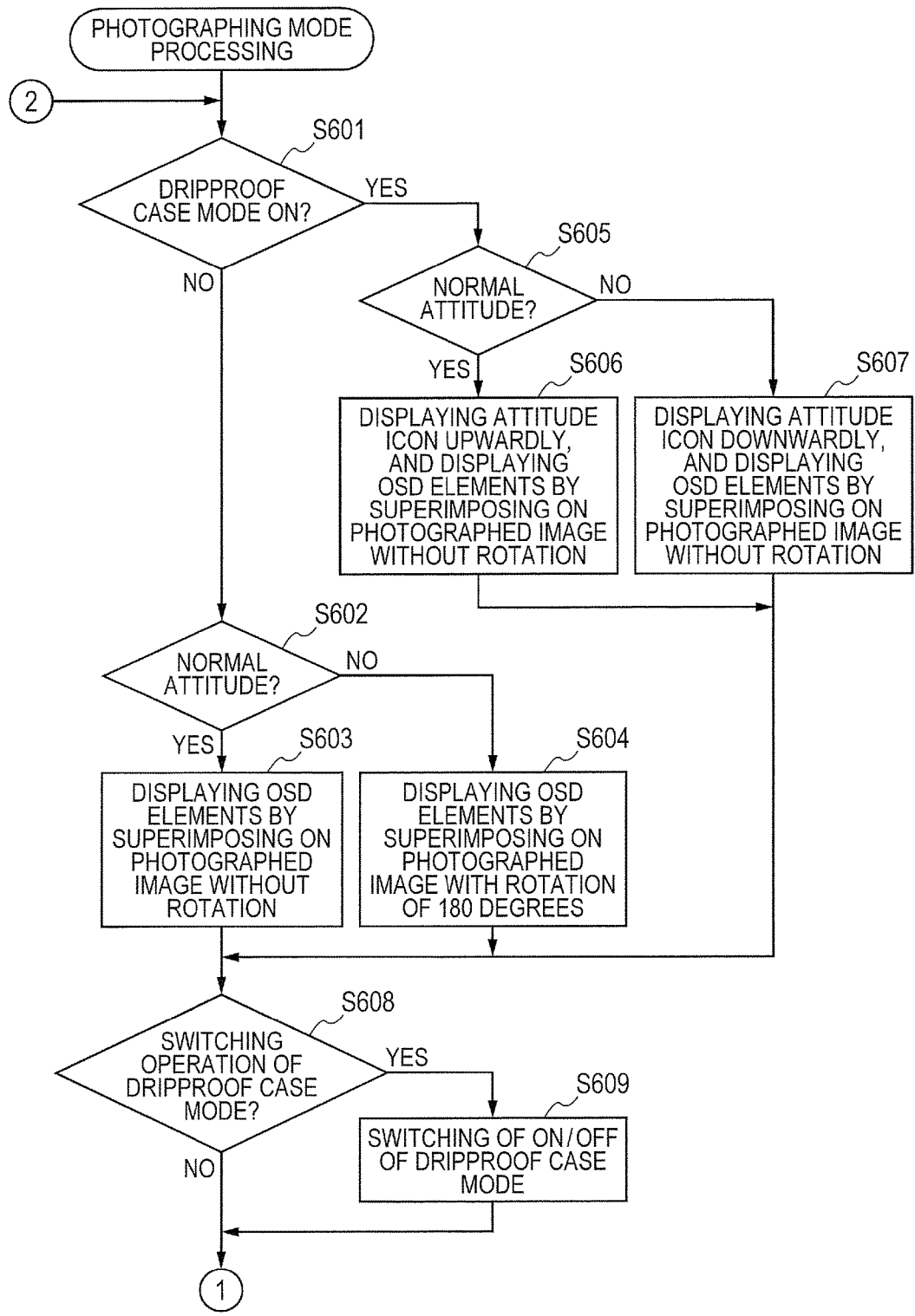
FIGS. 6A and 6B are a part of an operation flowchart in the embodiment.
Figure 6B:
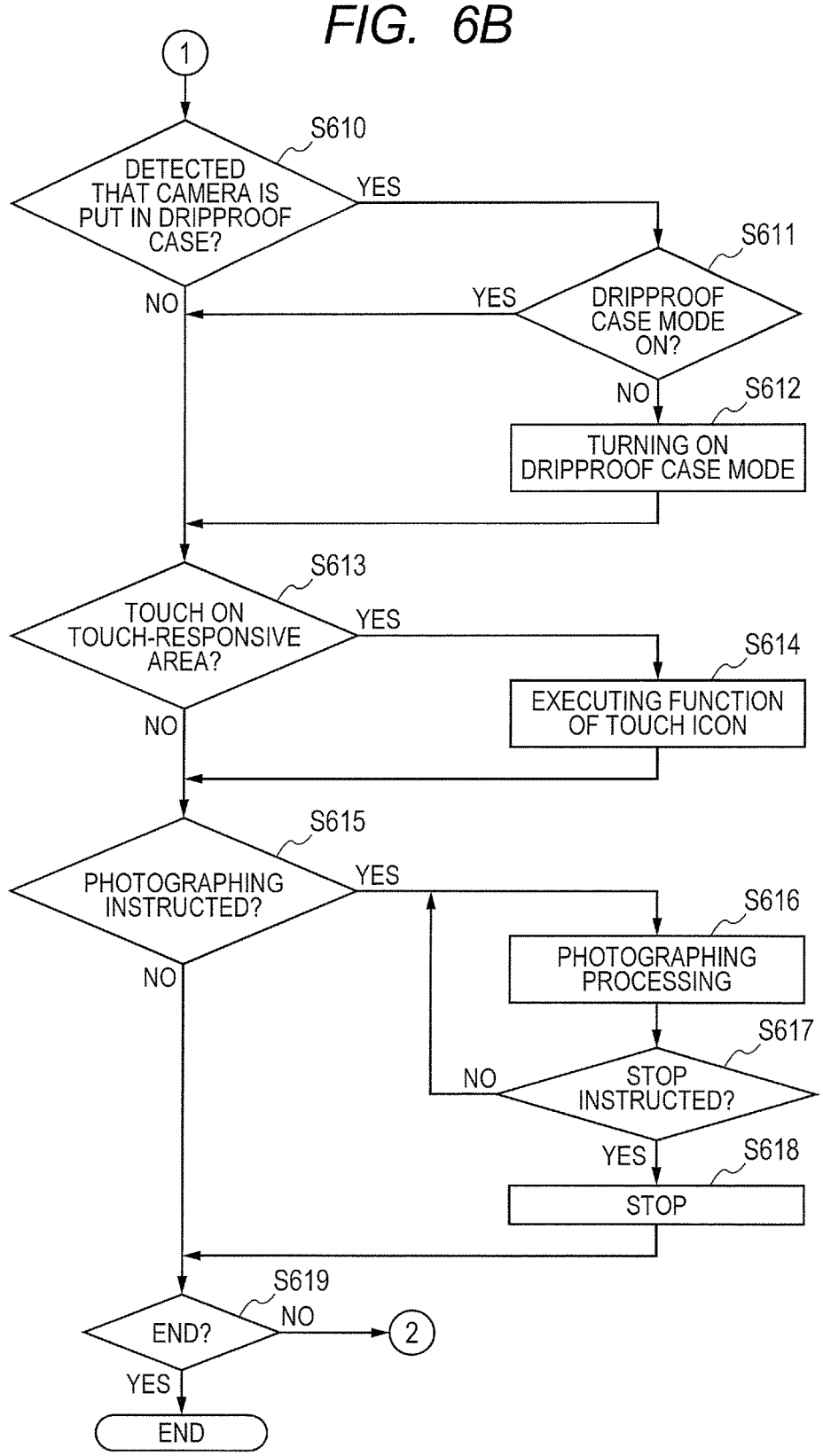

FIGS. 6A and 6B illustrate flowcharts for a photographing mode processing in the digital camera 100. This processing is realized by a method whereby the CPU 107 reads out a control program from the program/data storage unit 106, develops this into the temporary storage unit 103, and successively executes it. When the digital camera 100 is activated and set into the photographing mode, the CPU 107 starts the processing illustrated in FIGS. 6A and 6B.

In step S601, with reference to setting information stored in the program/data storage unit 106, the CPU 107 discriminates whether or not the camera is set into the drip-proof case mode. If the camera is set into the drip-proof case mode, the CPU 107 advances to step S602. If NO, step S605 follows. As described before, in the state in which the camera 100 is put in the drip-proof case, an output of the case detection unit 113 is turned ON and the CPU 107 sets the drip-proof case mode to ON.

In step S602, on the basis of an output value of the attitude detection unit 110, the CPU 107 discriminates whether or not the current attitude of the digital camera 100 is the normal attitude. If it is determined that the camera is in the normal attitude, the CPU 107 advances to step S603. If NO, that is, if the camera is in the inverse attitude, step S604 follows.

In step S603, the CPU 107 displays the photographed image (live-view image) 206 onto the LCD panel 112 and displays various kinds of OSD elements (including the touch icons 201 to 204 and the attitude icon 205) without rotating them, so as to be superimposed to the live-view image. An arrow of the attitude icon 205 is displayed so that it is directed to the upward position of the digital camera 100 so as to indicate the normal attitude, as illustrated in FIG. 3A.

In step S604, the CPU 107 displays the photographed image (live-view image) 206 onto the LCD panel 112, rotates various kinds of OSD elements (including the touch icons 201 to 204 and the attitude icon 205), and displays them so as to be superimposed to the live-view image. The arrow of the attitude icon 205 is displayed so that it is directed to the downward position of the digital camera 100 so as to indicate the inverse attitude as illustrated in FIG. 3B.

In step S605, on the basis of the output value of the attitude detection unit 110, the CPU 107 discriminates whether or not the current attitude of the digital camera 100 is the normal attitude. If it is determined that the camera is in the normal attitude, the CPU 107 advances to step S606. If NO, that is, if the camera is in the inverse attitude, step S607 follows.

In step S606, the CPU 107 displays the photographed image (live-view image) 206 onto the LCD panel 112 and displays various kinds of OSD elements (including the touch icons 201 to 204 and 207 and the attitude icon 205) without rotating them so as to be superimposed to the live-view image. The arrow of the attitude icon 205 is displayed so that it is directed to the upward position of the digital camera 100 so as to indicate the normal attitude. At this time, the display is performed in a manner similar to that shown in FIG. 3C, except that the arrow of the attitude icon 205 indicates the upward position of the digital camera 100.

In step S607, the CPU 107 displays the photographed image (live-view image) 206 onto the LCD panel 112, and displays various kinds of OSD elements (including the touch icons 201 to 204 and 207 and the attitude icon 205), without rotating them so as to be superimposed to the live-view image. The arrow of the attitude icon 205 is displayed so that it is directed to the downward position of the digital camera 100 so as to indicate the inverse attitude. At this time, the display is performed in a manner similar to FIG. 3C.

When the drip-proof case mode is ON, the display positions (and directions) of the OSD elements are substantially the same as those mentioned above (steps S606, S607), except that the direction of the arrow of the attitude icon 205 differs. When comparing this with the case when the drip-proof case mode is OFF (step S603), in a case when the drip-proof case mode is ON (steps S606, S607), the display positions of the touch icons 201 to 204 are deviated upwardly (on the center side of the LCD panel 112). When comparing the display in step S606 with the display in step S607, although the image of the object projected to the live-view image is upside-down when referring to the orientation of the digital camera 100 as a reference, the rotation processing is not performed in both of them. In other words, when viewing from the user, the camera is set to the same orientation in both of them and the orientation is matched with the object 210 in the actual world. On the other hand, the positions and directions of the OSD elements when viewing from the user are upside down.

In step S608, the CPU 107 discriminates whether or not the operation to switch ON/OFF of the drip-proof case mode is performed. If the switching operation is performed (step S608), the CPU 107 advances to step S609. If NO, step S610 follows. ON/OFF of the drip-proof case mode can be switched on the basis of the user operation on a drip-proof case mode setting display screen that is displayed by selecting a drip-proof case mode setting item included in a setting menu. In a case when the drip-proof case mode is ON, the CPU 107 displays the drip-proof case mode setting screen onto the LCD panel 112, in accordance with a touch to the touch icon 207 that is displayed together with the live-view image.

In step S609, the CPU 107 switches ON/OFF of the drip-proof case mode in accordance with the switching operation of the drip-proof case mode executed by the user. When the drip-proof case mode is ON, the drip-proof case mode is cancelled, that is, is turned OFF. When the drip-proof case mode is OFF, the drip-proof case mode is turned ON. The CPU 107 stores a result of the switching operation into the program/data storage unit 106.

In step S610, on the basis of the output from the case detection unit 113, the CPU 107 discriminates whether or not the digital camera 100 is put in the drip-proof case. When it is detected that the camera is put in the drip-proof case, the CPU 107 advances to S611. If NO, S613 follows.

In step S611, with reference to the current setting information stored in the program/data storage unit 106, the CPU 107 discriminates whether or not the drip-proof case mode is ON. If the drip-proof case mode is ON, since there is no need to change the setting, the CPU 107 advances to step S613. In a case when the drip-proof case mode is OFF, the CPU 107 advances to step S612, sets the drip-proof case mode to ON, and stores a setting value (ON) into the program/data storage unit 106. In this manner, the CPU 107 automatically turns on the drip-proof case mode in accordance with the enclosure of the camera into the drip-proof case.

In step S613, the CPU 107 discriminates whether or not there is a touch to the touch-responsive area of any one of the touch icons including the touch icons 201 to 204 and 207. If there is a touch, the CPU 107 advances to step S614. If NO, step S615 follows.

In step S614, the CPU 107 executes the function allocated to the touch icon corresponding to the touched touch-responsive area. For example, in the case of the touch icon to which a function to open the setting menu is allocated, the CPU 107 opens the setting menu. The processing shown in S614 may be executed in accordance with Touch-Down to the touch-responsive area or may be executed in accordance with the detection of the tap to the touch-responsive area (such an operation that Touch-Up is performed from Touch-Down without performing Touch-Move). The processing shown in step S614 may be executed in accordance with the detection of the long touch to the touch-responsive area (such an operation that Touch-On continues for a predetermined time or longer after Touch-Down is performed).

In step S615, the CPU 107 discriminates whether or not a photographing instruction is made. As for the photographing instruction here, there is a case when a photographing instruction button provided for the digital camera 100 is depressed, a case when there is a touch operation to a moving image photographing start key included in the touch icons 201 to 204, or the like. Although a still image photographing instruction is also included, the following operation will now be described on the assumption that the moving image photographing instruction is input. When such a photographing instruction is input, the CPU 107 advances to step S616. If NO, step S619 follows.

In step S616, the CPU 107 executes a photographing processing. In the photographing processing of the moving image, in a case when the camera is in the inverse attitude, on the basis of the attitude detection by the attitude detection unit 110 at a point of time of the photographing start, the CPU 107 executes a processing for rotating the photographed moving image by one hundred eighty degrees and, thereafter, records the rotated image as a moving image file. By executing such a processing, the moving image photographed by setting the digital camera 100 into the inverse attitude can be displayed in the non-inverse orientation upon reproduction. With respect to the attitude after the start of the moving image photographing, the CPU 107 does not refer to a result of the attitude detection of the attitude detection unit 110. That is, in a case when the camera is in the inverse attitude at the time of starting the moving image photographing, even if the attitude of the digital camera 100 is changed to the normal attitude on the way of photographing, the CPU 107 rotates the photographed image by one hundred eighty degrees and records.

In the case of the still image photographing, the CPU 107 determines the attitude of the digital camera 100 at the time of photographing the still image from any one of the four attitudes such as a normal attitude, an inverse attitude, a clockwise lateral attitude between the normal attitude and the inverse attitude, and a counterclockwise lateral attitude between them. If the camera is in the inverse attitude, the CPU 107 rotates the photographed image by one hundred eighty degrees, and records. If the camera is in the normal attitude, the clockwise lateral attitude, or the counterclockwise lateral attitude, the CPU 107 records the photographed image without rotating. If the camera is in the clockwise lateral attitude or the counterclockwise lateral attitude, the CPU 107 further records an attitude flag (attitude information) showing which one of the clockwise lateral attitude and the counterclockwise lateral attitude is the lateral attitude of the camera 100 as attribute information in association with the photographed image.

In step S617, the CPU 107 discriminates whether or not there is a photographing stop instruction of the moving image. If there is not the stop instruction, the CPU 107 returns to step S616 and continues the photographing of the moving image. If there is the stop instruction, the CPU 107 advances to step S618, finishes the photographing of the moving image, and executes an end processing, such as a processing for closing a moving image file. In the case of the still image photographing, the CPU 107 passes or omits the processings of steps S617 and S618.

In step S619, the CPU 107 discriminates whether or not there is an event to finish the photographing mode processing. As an event to finish the photographing mode processing, there are an operation to turn off a power source, an operation to shift an operation mode to another operation mode, such as a reproduction mode, or the like, an operation to detect that a cover of a storage slot of a recording medium, such as a memory card, or the like, is opened, and the like. If there is not the event to finish the photographing mode processing, the CPU 107 returns to step S601 and successively executes the photographing mode processing. If there is the event to finish the photographing mode processing (step S619), the CPU 107 finishes the photographing mode processing.

As described above, in the present embodiment, in a case when the drip-proof case mode is ON, the touch panel can be operated from outside of the drip-proof case through the operation members of the drip-proof case irrespective of the attitude of the camera 100.

In the present embodiment, in a case when the case detection unit 113 detects the enclosure of the digital camera 100 into the drip-proof case, the camera 100 is automatically set into the drip-proof case mode. The case detection unit 113 may be omitted, however, and the camera 100 may be manually set into the drip-proof case mode. In this case, the case detection unit 113 and the processings in steps S610 to S612 in FIG. 6B are unnecessary, and the costs and a processing load can be reduced. Or, it is also possible to construct in such a manner that while the case detection unit 113 is provided, if the enclosure of the digital camera 100 into the drip-proof case is detected, whether or not the drip-proof case mode is automatically turned on can be set.

On the contrary, in place of providing the case detection unit 113, it is also possible to construct in such a manner that the mode cannot be manually switched to the drip-proof case mode. In this case, the drip-proof in steps S608 and S609 in FIG. 6A are unnecessary, and only when it is detected in step S610 that the camera 100 is put in the drip-proof case, the camera 100 is set into the drip-proof case mode.

In the foregoing embodiment, in a case when the drip-proof case mode is ON, even if the attitude is changed, the display orientation of the touch icon is not changed. However, since it is sufficient that the touch-responsive areas of the touch icons exist in the positions where the operation members 401 to 404 provided for the drip-proof case may be operational, it is also possible to operate in such a manner that only the orientation of the touch icon is changed. That is, the processing in step S607 is changed in such a manner that while the touch icon is displayed at the same position as the display position in step S606, in the case of the normal attitude, only the orientation is rotated by one hundred eighty degrees, and displayed. By operating in this manner, for the user who holds the digital camera 100 in the inverse attitude, a character train, or the like, displayed as a touch icon, can be easily visually confirmed.

In the foregoing embodiment, only in a case when the drip-proof case mode is OFF and the camera 100 is in the inverse attitude, the OSD elements are rotated and displayed. In a case when the camera 100 is in the normal attitude or in the lateral attitude, in which the camera is rotated by about ninety degrees, however, a layout of the OSD elements may be changed to a layout for the lateral attitude. Specifically speaking, in a case when the drip-proof case mode is OFF, the positions of the touch-responsive areas corresponding to the display positions of the touch icons are changed in accordance with whether the digital camera 100 is in the normal attitude or the lateral attitude. On the other hand, in a case when the drip-proof case mode is ON, irrespective of the attitude about whether the digital camera 100 is in the normal attitude or the lateral attitude, the display positions of the touch icons are fixed and the touch-responsive areas are set to the positions where the touch panel is operational from the outside by the operation members 401 to 404 of the drip-proof case.

It is also possible to operate in such a manner that a plurality of modes corresponding to types of the drip-proof cases are prepared for the drip-proof case mode and any one of them can be manually selected and set. In this case, the case detection unit 113 may be constructed in such a manner that, in which type of case the camera is put, can be detected, and the CPU 107 automatically sets the mode to the mode suitable for the detected case type.

For example, the mode can be manually or automatically set to any one of a case mode OFF and case modes 1 to 3.

Case mode 1 is a drip-proof case mode for the drip-proof case illustrated in FIG. 4, and is a drip-proof case mode that is set by the processings illustrated in FIGS. 6A and 6B. The CPU 107 sets the touch-responsive areas 301 to 304 of the touch icons 201 to 204 to the positions described in FIG. 3C.

Case mode 2 is a mode in the case of presuming that the drip-proof case illustrated in FIG. 4 is a drip-proof case having operation members with which the touch panel can be touched by operating from the outside at different positions. The CPU 107 fixedly sets the touch-responsive areas 301 to 304 of the touch icons 201 to 204 to the positions different from the positions described in FIG. 3C, irrespective of the attitude.

Case mode 3 is a mode in the case when, different from the drip-proof case illustrated in FIG. 4, such a drip-proof case that an operation to any position on the touch panel can be performed from outside is presumed. The CPU 107 sets the touch-responsive areas 301 to 304 of the touch icons 201 to 204 to the different positions, in accordance with the attitude in a manner similar to that in the case when the drip-proof case mode is OFF.

Although the example of the drip-proof case has been described as a case in which the digital camera 100 is put in the present embodiment, the invention is not limited to such an example. That is, the invention can be applied to a case of putting the camera into another enclosing case to be used for the purpose of waterproof, drip-proof, dustproof, scratchproof, dirtproof, shock resistance, pressure resistance, windproof, and the like.

The control of the CPU 107 may be performed by one hardware or the control of the whole apparatus may be performed by sharing the processings by a plurality of hardware.

Although the invention is described in detail above with respect to the exemplary embodiments, the invention is not limited to those specific embodiments, but various embodiments in a range without departing from the essence of the invention are also incorporated in the invention. Further, the foregoing embodiments are nothing but embodiments of the invention, and those embodiments may be properly combined.

Although the embodiments in which the invention is applied to the digital camera 100 have been described above, the invention is not limited to such examples. Rather, the invention can be applied to another electronic apparatus having a touch panel having a possibility that it is put in a case (housing). That is, the invention can be applied to a portable personal computer (what is called a tablet PC), a personal digital assistant (PDA), a mobile telephone terminal, a mobile image viewer, a digital photoframe, a music player, a game player, an electronic book reader, and the like. There is a case when those apparatuses are put in some enclosing case to be used for the purpose of waterproof, drip-proof, dustproof, scratchproof, dirtproof, shock resistance, pressure resistance, windproof, and the like. In the case when each of those apparatuses has a touch panel, and the operation to the touch panel is performed from outside of the case in which the camera is put, by applying the invention, advantages of the invention can be obtained.

Other Embodiments

Embodiments of the present invention can also be realized by a computer of a system or an apparatus that reads out and executes computer-executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic apparatus comprising:
    a touch detection unit configured to detect a touch operation to a display unit;
    a display control unit configured to control operation so as to display a touch icon to the display unit;
    an attitude detection unit configured to detect an attitude of the electronic apparatus;
    a setting unit configured to set a case mode to be used in a case when the electronic apparatus is put in a case; and
    a control unit configured to control operation, in a case when the case mode is not set by the setting unit, to change a position of a touch-responsive area adapted to receive a touch operation to the touch icon in accordance with the attitude of the electronic apparatus detected by the attitude detection unit, and, in a case when the case mode is set by the setting unit, not to change the position of the touch-responsive area irrespective of the attitude of the electronic apparatus.

2. An apparatus according to claim 1, further comprising an execution unit configured to execute a specific function corresponding to the touch icon in accordance with the detection of the touch operation to the touch-responsive area.

3. An apparatus according to claim 1, wherein the display control unit controls operation so as to display a display item showing the attitude of the electronic apparatus according to the attitude detected by the attitude detection unit on the display unit.

4. An apparatus according to claim 1, wherein the display control unit controls operation so as to change at least one of a display position and a size of the touch icon in accordance with the setting unit setting the case mode.

5. An apparatus according to claim 1, wherein the case is arranged such that if the electronic apparatus is put in the case, the touch operation can be performed to a specific position of the display unit from outside of the case through an operation member provided for the case.

6. An apparatus according to claim 1, wherein the control unit controls operation to allocate a first function that is a function that is not allocated to the touch icon, in a case when the apparatus is not set to the case mode, and is allocated to an operation unit arranged at a position where it is not operational if the electronic apparatus is put in the case, the touch icon in accordance with the setting unit setting the case mode.

7. An apparatus according to claim 6, wherein the first function is a still image photographing instruction.

8. An apparatus according to claim 6, wherein the control unit controls operation to allocate a second function that is allocated to the touch icon in a case when the apparatus is not set to the case mode is allocated, to the operation unit in accordance with the setting unit setting the case mode.

9. An apparatus according to claim 1, wherein the setting unit sets the case mode in accordance with an operation of a user.

10. An apparatus according to claim 9, wherein the display control unit controls operation so as to display a display item for cancelling the setting of the case mode on the display unit in accordance with the setting unit setting the case mode.

11. An apparatus according to claim 1, further comprising an enclosure detection unit configured to detect that the electronic apparatus is put in the case,
wherein the setting unit sets the apparatus into the case mode in accordance with the enclosure detection unit detecting the enclosure of the apparatus into the case.

12. An apparatus according to claim 11, wherein (i) the enclosure detection unit is arranged to detect a type of the case in which the electronic apparatus is put, and (ii) the setting unit sets the apparatus into a case mode corresponding to the type of the case detected by the enclosure detection unit among a plurality of case modes.

13. An apparatus according to claim 1, further comprising an imaging unit,
wherein the display control unit controls operation so as to display a live-view image picked up by the imaging unit together with the touch icon, and
the control unit does not rotate the live-view image to be displayed, irrespective of whether or not the case mode is set by the setting unit and irrespective of the attitude detected by the attitude detection unit.

14. An apparatus according to claim 13, wherein the control unit controls operation to rotate the image picked up by the imaging unit in accordance with the attitude detected by the attitude detection unit and record the rotated image in a recording medium.

15. An apparatus according to claim 14, wherein the control unit controls operation to associate, as attribute information, attitude information according to the attitude detected by the attitude detection unit with the image picked up by the imaging unit and to record the image associated with the attitude information in the recording medium.

16. An apparatus according to claim 1, wherein the control unit controls operation, in a case when the case mode is set by the setting unit, to change a display orientation of the touch icon in accordance with the attitude of the electronic apparatus without changing a display position of the touch icon.

17. An apparatus according to claim 1, wherein the electronic apparatus is a mobile telephone terminal.

18. A non-transitory computer-readable storage medium storing a program for causing a computer to function as each unit of the electronic apparatus according to claim 1.

19. A method of controlling an electronic apparatus, the method comprising:
a touch detection step of detecting a touch operation to a display unit;
a display control step of controlling operation so as to display a touch icon to the display unit;
an attitude detection step of detecting an attitude of the electronic apparatus;
a setting step of setting a case mode to be used in a case when the electronic apparatus is put in a case; and
a control step of controlling operation, in a case when the case mode is not set in the setting step, to change a position of a touch-responsive area adapted to receive a touch operation to the touch icon in accordance with the attitude of the electronic apparatus detected by the attitude detection step, and, in a case when the case mode is set in the setting step, not to change the position of the touch-responsive area, irrespective of the attitude of the electronic apparatus.

20. An electronic apparatus comprising:
an attitude detection unit configured to detect an attitude of the electronic apparatus used;
a touch panel;
a display control unit configured to display an operation key for operating the electronic apparatus to the touch panel;
a setting unit configured to set the apparatus into a case mode in which the electronic apparatus is put in a case and used; and
a control unit configured to control operation, in a case when the case mode is not set by the setting unit, to change a position of the operation key that is displayed to the touch panel in accordance with the attitude of the electronic apparatus detected by the attitude detection unit, and, in a case when the case mode is set by the setting unit, not to change the position of the operation key that is displayed to the touch panel, in accordance with a result of the detection by the attitude detection unit.

21. A non-transitory computer-readable storage medium storing a program for causing a computer to function as each unit of the electronic apparatus according to claim 20.

22. A method of controlling an electronic apparatus having a touch panel, the method comprising:
an attitude detection step of detecting an attitude of the electronic apparatus used;
a display control step of displaying an operation key for operating the electronic apparatus to the touch panel;
a setting step of setting the apparatus into a case mode in which the electronic apparatus is put in a case and used; and
a control step of controlling operation, in a case when the case mode is not set in the setting step, to change a position of the operation key that is displayed to the touch panel in accordance with the attitude of the electronic apparatus detected in the attitude detection step, and, in a case when the case mode is set in the setting step, not to change the position of the operation key that is displayed to the touch panel, in accordance with a result of the detection in the attitude detection step.

23. An electronic apparatus comprising:
an attitude detection unit configured to detect an attitude of the electronic apparatus used;
a touch panel;

a display control unit configured to display an operation key for operating the electronic apparatus to the touch panel;
a case detection unit configured to detect whether or not the electronic apparatus is put in a case; and
a control unit configured to effect control in accordance with a result of the detection by the case detection unit such that when the apparatus is not put in the case, a position of the operation key that is displayed to the touch panel is changed in accordance with the attitude of the electronic apparatus detected by the attitude detection unit, and in a case when the apparatus is put in the case, the position of the operation key that is displayed to the touch panel is not changed according to the result of the detection by the attitude detection unit.

24. A non-transitory computer-readable storage medium storing a program for causing a computer to function as each unit of the electronic apparatus according to claim 23.

25. A method of controlling an electronic apparatus having a touch panel, the method comprising:
an attitude detection step of detecting an attitude of the electronic apparatus used;
a display control step of displaying an operation key for operating the electronic apparatus to the touch panel;
a case detection step of detecting whether or not the electronic apparatus is put in a case; and
a control step of effecting control in accordance with a result of the detection in the case detection step such that when the apparatus is not put in the case, a position of the operation key that is displayed to the touch panel is changed in accordance with the attitude of the electronic apparatus detected by the attitude detection step, and when the apparatus is put in the case, the position of the operation key that is displayed to the touch panel is not changed according to the result of the detection in the attitude detection.

* * * * *